(12) United States Patent
Li et al.

(10) Patent No.: US 10,482,644 B2
(45) Date of Patent: Nov. 19, 2019

(54) METHOD, APPARATUS AND ELECTRONIC DEVICE FOR PROCESSING PANORAMIC IMAGE (71) Applicants: Chaofeng Li, Beijing (CN); Hong Yi, Beijing (CN); Liyan Liu, Beijing (CN); Haihua Yu, Beijing (CN); Hongyi Liu, Beijing (CN)

(72) Inventors: Chaofeng Li, Beijing (CN); Hong Yi, Beijing (CN); Liyan Liu, Beijing (CN); Haihua Yu, Beijing (CN); Hongyi Liu, Beijing (CN)

(73) Assignee: Ricoh Company, Ltd., Tokyo (JP)

(*) Notice: Subject to any disclaimer, the term of this patent is extended or adjusted under 35 U.S.C. 154(b) by 105 days.

(21) Appl. No.: 15/868,131

(22) Filed: Jan. 11, 2018

(65) Prior Publication Data
US 2018/0253879 A1 Sep. 6, 2018

(30) Foreign Application Priority Data
Mar. 2, 2017 (CN) .......................... 2017 1 0121375

(51) Int. Cl.
G06T 11/60 (2006.01)
G06T 7/70 (2017.01)
G06T 7/11 (2017.01)
H04N 5/232 (2006.01)

(52) U.S. Cl.
CPC ................ G06T 11/60 (2013.01); G06T 7/11 (2017.01); G06T 7/70 (2017.01); H04N 5/23238 (2013.01)

(58) Field of Classification Search
CPC ... G06T 11/60; G06T 7/11; G06T 7/70; G06T 3/0062; H04N 5/23238
See application file for complete search history.

(56) References Cited

U.S. PATENT DOCUMENTS

| | | | |
|---|---|---|---|
| 2008/0134094 A1* | 6/2008 | Samadani | G06T 3/0012 715/838 |
| 2018/0063505 A1* | 3/2018 | Lee | H04N 13/106 |
| 2019/0108611 A1* | 4/2019 | Izumi | G06T 3/0062 |
| 2019/0166382 A1* | 5/2019 | He | H04N 19/597 |

* cited by examiner

*Primary Examiner* — David F Dunphy
(74) *Attorney, Agent, or Firm* — IPUSA, PLLC (57) ABSTRACT A method, an apparatus and an electronic device for processing a panoramic image are provided. The method includes converting a first planar projection image of the panoramic image into a spherical image; determining a position of a region of interest in the spherical image; and cutting and expanding the spherical image based on the position of the region of interest in the spherical image, and obtaining a second planar projection image of the panoramic image. A distance between the region of interest in the second planar projection image and a center point of the second planar projection image is shorter than a distance between the region of interest in the first planar projection image and a center point of the first planar projection image.

11 Claims, 10 Drawing Sheets

METHOD, APPARATUS AND ELECTRONIC DEVICE FOR PROCESSING PANORAMIC IMAGE

CROSS-REFERENCE TO RELATED APPLICATIONS

The present application claims priority under 35 U.S.C. § 119 to Chinese Application No. 201710121375.7 filed on Mar. 2, 2017, the entire contents of which are incorporated herein by reference.

BACKGROUND OF THE INVENTION

1. Field of the Invention

The present invention relates to the field of panoramic image processing, and specifically, a method, an apparatus and an electronic device for processing a panoramic image.

2. Description of the Related Art

Video information is important for information representation in daily life. Particularly, with the development of network technology, video technology has been applied to daily life, such as video conference, videophone, monitoring and the like.

An ordinary camera cannot capture a multi-directional image and a visual range of a video is limited, accordingly a panoramic camera is usually used for capturing a panoramic image.

A panoramic image can display all image information on an image, accordingly the limitation of visual range can be overcome. Conventionally, when processing a panoramic image, the spherical panoramic image is converted into an equidistant cylindrical projection (also called equirectangular projection) image whose aspect ratio is 2:1, then image detection is performed for a region of interest (ROI) in the equidistant cylindrical projection image to obtain image information. However, if the region of interest is close to or located in a north pole or a south pole of the panoramic image, large distortion of the image will occur in the region of interest after converting the spherical panoramic image into the equidistant cylindrical projection image, accordingly accuracy of the subsequent image detection deteriorates.

SUMMARY OF THE INVENTION

According to an aspect of the present invention, a method for processing a panoramic image includes converting a first planar projection image of the panoramic image into a spherical image; determining a position of a region of interest in the spherical image; and cutting and expanding, based on the position of the region of interest in the spherical image, the spherical image, and obtaining a second planar projection image of the panoramic image. A distance between the region of interest in the second planar projection image and a center point of the second planar projection image is shorter than a distance between the region of interest in the first planar projection image and a center point of the first planar projection image.

Furthermore, the first planar projection image is a first equidistant cylindrical projection image. Converting the first planar projection image of the panoramic image into the spherical image includes mapping a longer side at the top of the first equidistant cylindrical projection image and a longer side at the bottom of the first equidistant cylindrical projection image to a north pole of the spherical image and a south pole of the spherical image, respectively; and merging two shorter sides of the first equidistant cylindrical projection image at 0° longitude of the spherical image.

Furthermore, determining the position of the region of interest in the spherical image includes detecting the position of the region of interest in the spherical image by a method of color detection, motion detection or artificial feature detection.

Furthermore, cutting and expanding the spherical image based on the position of the region of interest in the spherical image includes determining longitude $\alpha$ of a center point of the region of interest in the spherical image; determining an intersection A between a meridian of $\alpha+180°$ longitude of the spherical image and an equator of the spherical image; cutting the spherical image along a cutting line on the equator, a length of the cutting line being equal to half of a length of the equator, and a center point of the cutting line being the intersection A; and expanding the cut spherical image in a first direction and a second direction, respectively, the first direction being a direction from the intersection A to a south pole of the spherical image, and the second direction being a direction from the intersection A to a north pole of the spherical image.

Furthermore, obtaining the second planar projection image of the panoramic image includes obtaining, based on pixel values of integer pixels in the first planar projection image, pixel values of corresponding points in the second planar projection image, and obtaining, by interpolation or extrapolation based on the pixel values of the corresponding points, pixel values of integer pixels adjacent to the corresponding points in the second planar projection image; or determining corresponding points in the first planar projection image corresponding to integer pixels in the second planar projection image, obtaining, by interpolation or extrapolation based on pixel values of integer pixels adjacent to the corresponding points in the first planar projection image, pixel values of the corresponding points, and obtaining, based on the pixel values of the corresponding points, pixel values of the integer pixels in the second planar projection image.

Furthermore, the method further includes performing image detection for the region of interest in the second planar projection image, after obtaining the second planar projection image of the panoramic image.

According to another aspect of the present invention, an apparatus for processing a panoramic image includes a first conversion module configured to convert a first planar projection image of the panoramic image into a spherical image; a detection module configured to determine a position of a region of interest in the spherical image; and a second conversion module configured to cut and expand, based on the position of the region of interest in the spherical image, the spherical image, and obtain a second planar projection image of the panoramic image. A distance between the region of interest in the second planar projection image and a center point of the second planar projection image is shorter than a distance between the region of interest in the first planar projection image and a center point of the first planar projection image.

Furthermore, the first planar projection image is a first equidistant cylindrical projection image. The first conversion module maps a longer side at the top of the first equidistant cylindrical projection image and a longer side at the bottom of the first equidistant cylindrical projection image to a north pole of the spherical image and a south pole of the spherical image, respectively; and merges two shorter sides of the first equidistant cylindrical projection image at 0° longitude of the spherical image.

Furthermore, the detection module detects the position of the region of interest in the spherical image by a method of color detection, motion detection or artificial feature detection.

Furthermore, the second conversion module includes a first processing unit configured to determine longitude $\alpha$ of a center point of the region of interest in the spherical image; a second processing unit configured to determine an intersection A between a meridian of $\alpha+180°$ longitude of the spherical image and an equator of the spherical image; a cutting unit configured to cut the spherical image along a cutting line on the equator, a length of the cutting line being equal to half of a length of the equator, and a center point of the cutting line being the intersection A; and an expanding unit configured to expand the cut spherical image in a first direction and a second direction, respectively, the first direction being a direction from the intersection A to a south pole of the spherical image, and the second direction being a direction from the intersection A to a north pole of the spherical image.

Furthermore, second conversion module includes a pixel value calculating unit configured to obtain, based on pixel values of integer pixels in the first planar projection image, pixel values of corresponding points in the second planar projection image, and obtain, by interpolation or extrapolation based on the pixel values of the corresponding points, pixel values of integer pixels adjacent to the corresponding points in the second planar projection image; or determine corresponding points in the first planar projection image corresponding to integer pixels in the second planar projection image, obtain, by interpolation or extrapolation based on pixel values of integer pixels adjacent to the corresponding points in the first planar projection image, pixel values of the corresponding points, and obtain, based on the pixel values of the corresponding points, pixel values of the integer pixels in the second planar projection image.

Furthermore, the apparatus further includes an image detection module configured to perform image detection for the region of interest in the second planar projection image, after obtaining the second planar projection image of the panoramic image.

According to another aspect of the present invention, an electronic device for processing a panoramic image includes a memory storing computer-readable instructions; and one or more processors configured to execute the computer-readable instructions such that the one or more processors are configured to convert a first planar projection image of the panoramic image into a spherical image, determine a position of a region of interest in the spherical image, and cut and expand, based on the position of the region of interest in the spherical image, the spherical image, and obtain a second planar projection image of the panoramic image. A distance between the region of interest in the second planar projection image and a center point of the second planar projection image is shorter than a distance between the region of interest in the first planar projection image and a center point of the first planar projection image.

DESCRIPTION OF THE EMBODIMENTS

In the following, specific embodiments of the present invention will be described in detail with reference to the accompanying drawings, so as to facilitate the understanding of technical problems to be solved by the present invention, technical solutions of the present invention, and advantages of the present invention.

In view of the problem of the conventional technology, embodiments of the present invention have an object to provide a method, an apparatus, and an electronic device for processing a panoramic image that can solve image distortion occurring in the vicinity of a north pole and a south pole of a panoramic image when converting the panoramic image into a planar projection image and can improve accuracy of image detection.

First Embodiment

Figure 1:
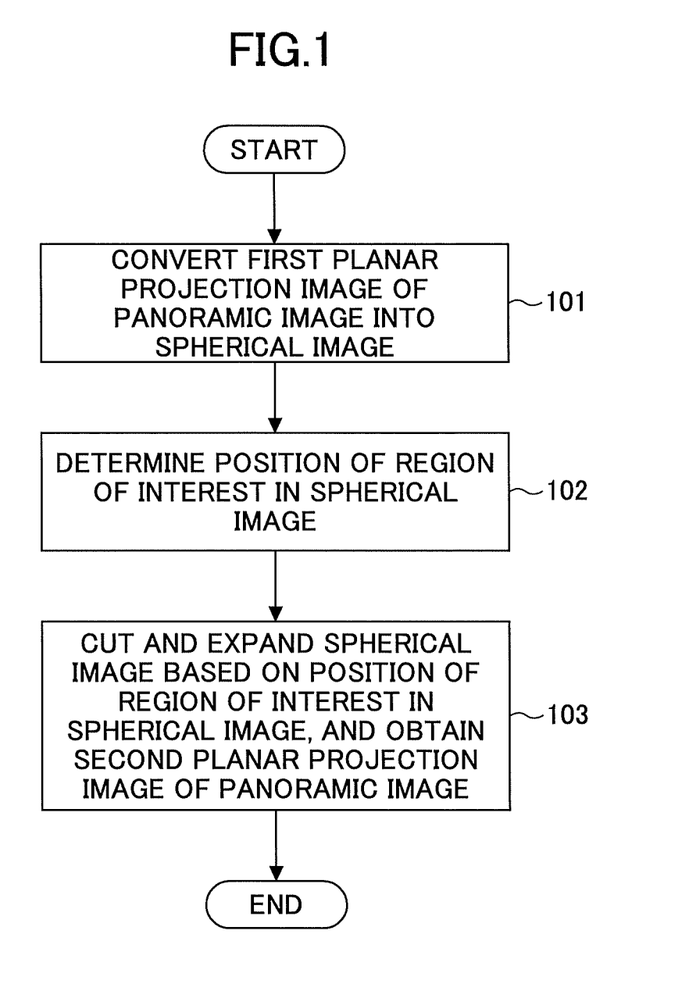
FIG. 1 is a flowchart illustrating a panoramic image processing method according to an embodiment of the present invention.

The present embodiment provides a panoramic image processing method. As illustrated in FIG. 1, the panoramic image processing method includes steps 101 to 103.

Step 101: convert a first planar projection image of the panoramic image into a spherical image.

Step 102: determine a position of a region of interest in the spherical image.

Step 103: cut and expand the spherical image based on the position of the region of interest in the spherical image, and obtain a second planar projection image of the panoramic image. Here, a distance between the region of interest in the second planar projection image and a center point of the second planar projection image is shorter than a distance between the region of interest in the first planar projection image and a center point of the first planar projection image.

In the present embodiment, the first planar projection image of the panoramic image is converted into the spherical image, the spherical image is cut and expanded based on the position of the region of interest in the spherical image, and the second planar projection image of the panoramic image is obtained. The distance between the region of interest in the second planar projection image and the center point of the second planar projection image is shorter than the distance between the region of interest in the first planar projection image and the center point of the first planar projection image. Thus, in the converted second planar projection image, the region of interest is closer to the center point of the second planar projection image, image distortion occurring in the region of interest can be reduced. Accordingly, the accuracy of the image detection can be improved when performing image detection for the region of interest in the second planar projection image.

The first planar projection image may be an equidistant cylindrical projection image whose aspect ratio is 2:1, and may also be another type of projection image. When the first planar projection image is an equidistant cylindrical projection image whose aspect ratio is 2:1, the converted second planar projection image is an equidistant cylindrical projection image whose aspect ratio is 1:2.

As an example, when the first planar projection image is a first equidistant cylindrical projection image, converting the first planar projection image of the panoramic image into the spherical image includes (a) mapping a longer side at the top of the first equidistant cylindrical projection image and a longer side at the bottom of the first equidistant cylindrical projection image to a north pole of the spherical image and a south pole of the spherical image, respectively, and (b) merging two shorter sides of the first equidistant cylindrical projection image at 0° longitude of the spherical image.

When detecting the position of the region of interest in the spherical image, the detection may be performed using a conventional ROI (region of interest) detection method. For example, the position of the region of interest in the spherical image may be detected by a method of color detection, motion detection or artificial feature detection.

Figure 2:
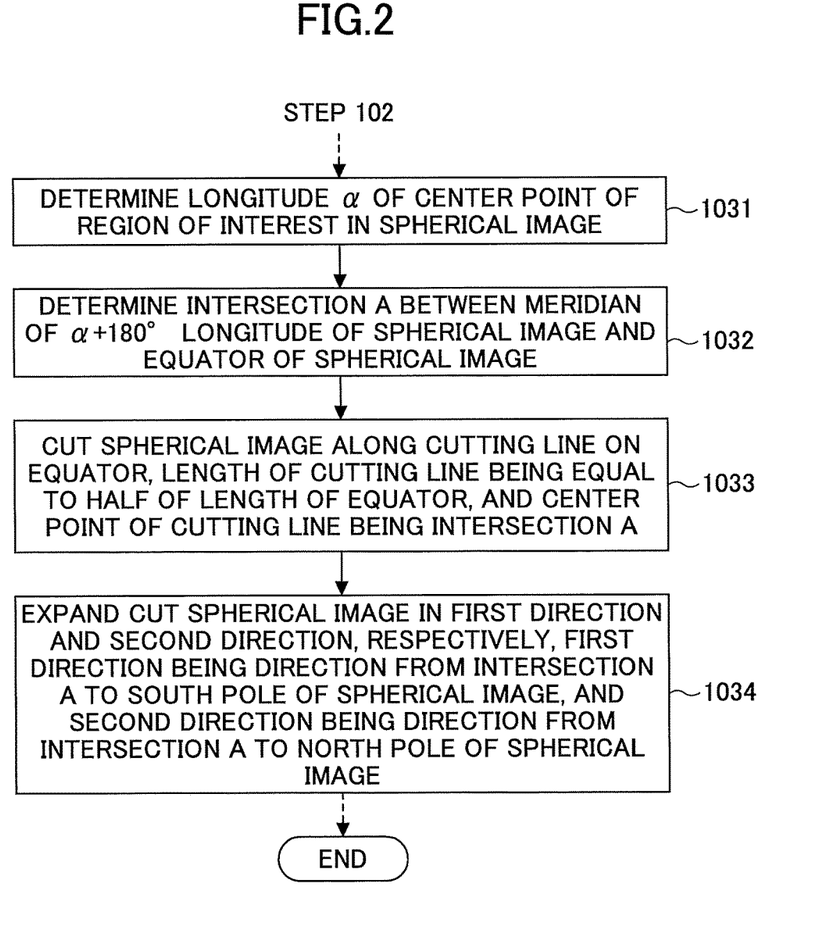
FIG. 2 is a flowchart illustrating a method of cutting and expanding a spherical image based on a position of a region of interest in the spherical image according to the embodiment of the present invention.

As an example, as illustrated in FIG. 2, cutting and expanding the spherical image based on the position of the region of interest in the spherical image includes steps 1031 to 1034.

Step 1031: determine longitude α of a center point of the region of interest in the spherical image.

Step 1032: determine an intersection A between a meridian of α+180° longitude of the spherical image and an equator of the spherical image.

Step 1033: cut the spherical image along a cutting line on the equator. A length of the cutting line is equal to half of a length of the equator, and a center point of the cutting line is the intersection A.

Step 1034: expand the cut spherical image in a first direction and a second direction, respectively. The first direction is a direction from the intersection A to a south pole of the spherical image, and the second direction is a direction from the intersection A to a north pole of the spherical image.

Furthermore, when converting the first planar projection image of the panoramic image into the second planar projection image of the panoramic image, it is necessary to determine a pixel value of each of integer pixels in the second planar projection image. Specifically, determining pixel values of integer pixels in the second planar projection image includes (a) obtaining, based on pixel values of integer pixels in the first planar projection image, pixel values of corresponding points in the second planar projection image, and obtaining, by interpolation or extrapolation based on the pixel values of the corresponding points, pixel values of integer pixels adjacent to the corresponding points in the second planar projection image; or (b) determining corresponding points in the first planar projection image corresponding to integer pixels in the second planar projection image, obtaining, by interpolation or extrapolation based on pixel values of integer pixels adjacent to the corresponding points in the first planar projection image, pixel values of the corresponding points, and obtaining, based on the pixel values of the corresponding points, pixel values of the integer pixels in the second planar projection image.

Figure 3:
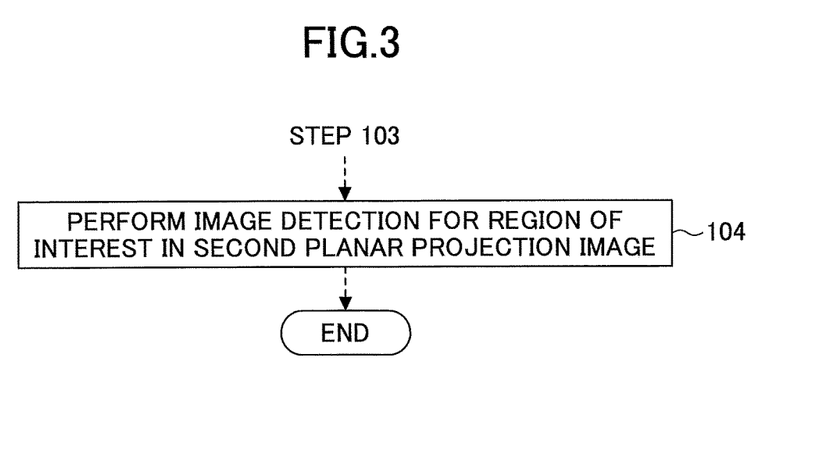
FIG. 3 is a flowchart illustrating a panoramic image processing method according to another embodiment of the present invention.

Furthermore, as illustrated in FIG. 3, after step 103, the panoramic image processing method further includes step 104.

Step 104: perform image detection for the region of interest in the second planar projection image. In this way, image distortion occurring in the region of interest in the second planar projection image can be reduced. Accordingly, the accuracy of the image detection can be improved when performing image detection for the region of interest in the second planar projection image.

In the embodiment of the present invention, the first planar projection image of the panoramic image is converted into the spherical image, the spherical image is cut and expanded based on the position of the region of interest in the spherical image, and the second planar projection image of the panoramic image is obtained. The distance between the region of interest in the second planar projection image and the center point of the second planar projection image is shorter than the distance between the region of interest in the first planar projection image and the center point of the first planar projection image. Thus, in the converted second planar projection image, the region of interest is closer to the center point of the second planar projection image, image distortion occurring in the region of interest can be reduced. Accordingly, the accuracy of the image detection can be improved when performing image detection for the region of interest in the second planar projection image.

Second Embodiment

Figure 4:
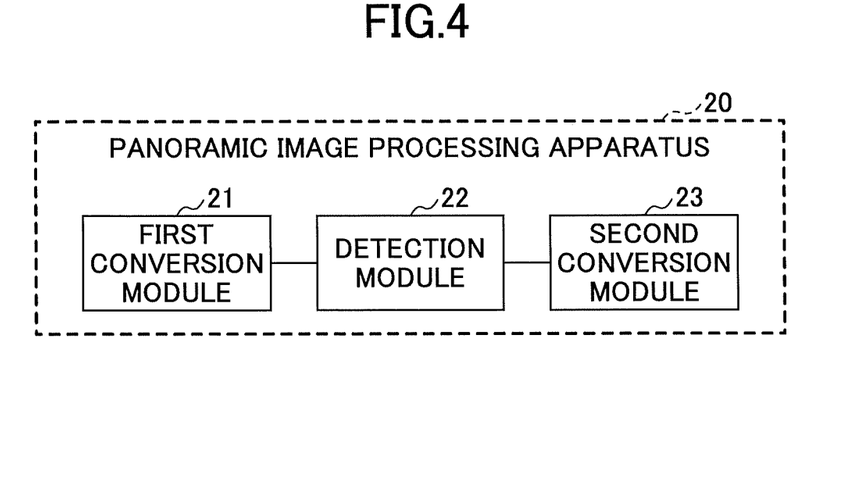
FIG. 4 is a block diagram illustrating a configuration of a panoramic image processing apparatus according to an embodiment of the present invention.

The present embodiment provides a panoramic image processing apparatus 20. As illustrated in FIG. 4, the panoramic image processing apparatus 20 includes a first conversion module 21, a detection module 22 and a second conversion module 23.

The first conversion module 21 converts a first planar projection image of the panoramic image into a spherical image.

The detection module 22 determines a position of a region of interest in the spherical image.

The second conversion module 23 cuts and expands the spherical image based on the position of the region of interest in the spherical image, and obtains a second planar projection image of the panoramic image. Here, a distance between the region of interest in the second planar projection image and a center point of the second planar projection image is shorter than a distance between the region of interest in the first planar projection image and a center point of the first planar projection image.

In the present embodiment, the first planar projection image of the panoramic image is converted into the spherical image, the spherical image is cut and expanded based on the position of the region of interest in the spherical image, and the second planar projection image of the panoramic image is obtained. The distance between the region of interest in the second planar projection image and the center point of the second planar projection image is shorter than the distance between the region of interest in the first planar projection image and the center point of the first planar projection image. Thus, in the converted second planar projection image, the region of interest is closer to the center point of the second planar projection image, image distortion occurring in the region of interest can be reduced. Accordingly, the accuracy of the image detection can be improved when performing image detection for the region of interest in the second planar projection image.

The first planar projection image may be an equidistant cylindrical projection image whose aspect ratio is 2:1, and may also be another type of projection image. When the first planar projection image is an equidistant cylindrical projection image whose aspect ratio is 2:1, the converted second planar projection image is an equidistant cylindrical projection image whose aspect ratio is 1:2.

As an example, when the first planar projection image is a first equidistant cylindrical projection image, the first conversion module 21 maps a longer side at the top of the first equidistant cylindrical projection image and a longer side at the bottom of the first equidistant cylindrical projection image to a north pole of the spherical image and a south pole of the spherical image, respectively, and merges two shorter sides of the first equidistant cylindrical projection image at 0° longitude of the spherical image.

When detecting the position of the region of interest in the spherical image, the detection may be performed using a conventional ROI (region of interest) detection method. For example, the detection module 22 detects the position of the region of interest in the spherical image by a method of color detection, motion detection or artificial feature detection.

Figure 5:
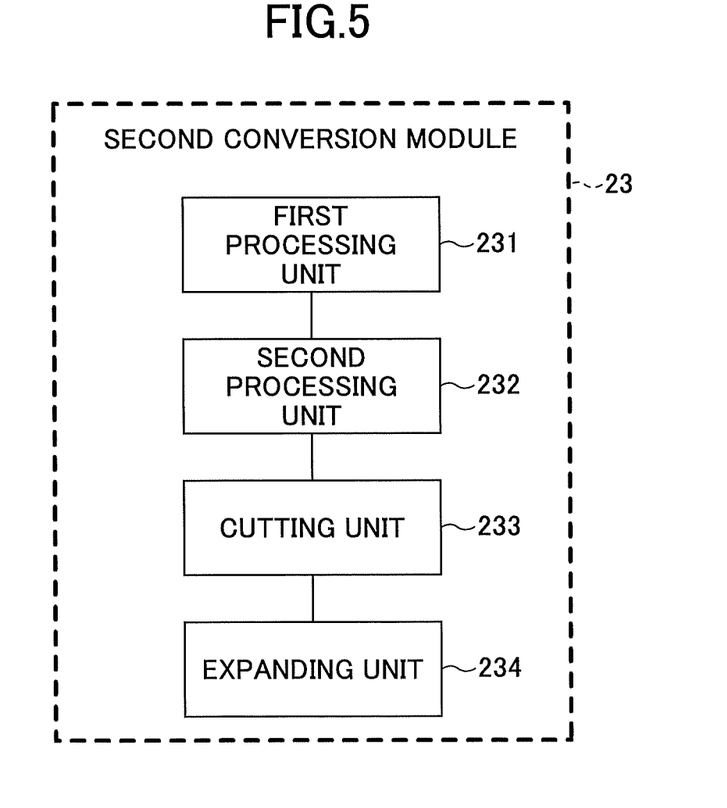
FIG. 5 is a block diagram illustrating a configuration of a second conversion module according to an embodiment of the present invention.

As an example, as illustrated in FIG. 5, the second conversion module 23 includes a first processing unit 231, a second processing unit 232, a cutting unit 233 and an expanding unit 234.

The first processing unit 231 determines longitude α of a center point of the region of interest in the spherical image.

The second processing unit 232 determines an intersection A between a meridian of α+180° longitude of the spherical image and an equator of the spherical image.

The cutting unit 233 cuts the spherical image along a cutting line on the equator. A length of the cutting line is equal to half of a length of the equator, and a center point of the cutting line is the intersection A.

The expanding unit 234 expands the cut spherical image in a first direction and a second direction, respectively. The first direction is a direction from the intersection A to a south pole of the spherical image, and the second direction is a direction from the intersection A to a north pole of the spherical image.

Figure 6:
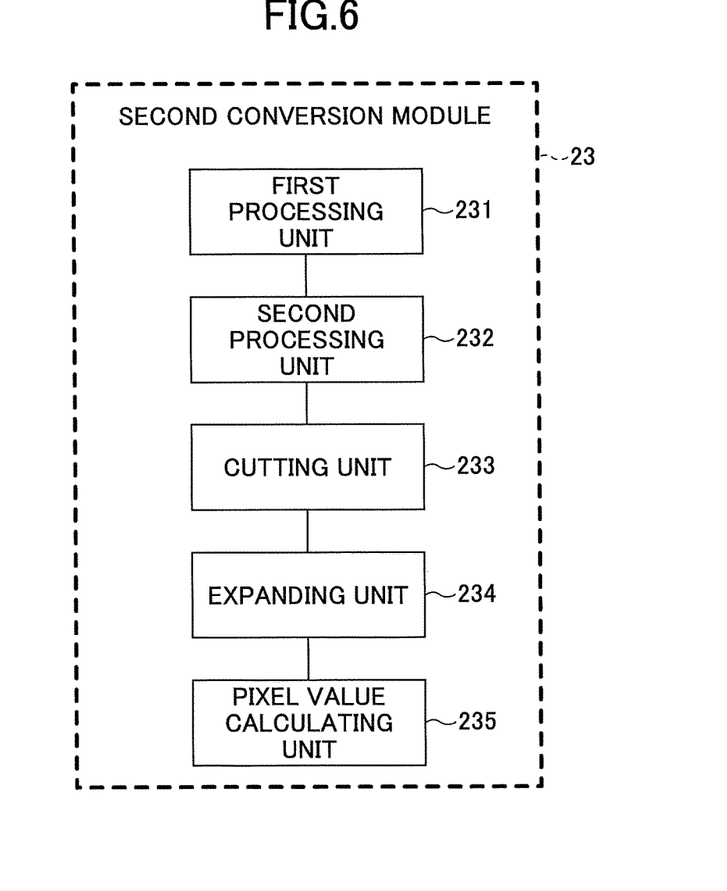
FIG. 6 is a block diagram illustrating a configuration of a second conversion module according to another embodiment of the present invention.

Furthermore, when converting the first planar projection image of the panoramic image into the second planar projection image of the panoramic image, it is necessary to determine a pixel value of each of integer pixels in the second planar projection image. Specifically, as illustrated in FIG. 6, the second conversion module 23 further includes a pixel value calculating unit 235.

The pixel value calculating unit 235 (a) obtains, based on pixel values of integer pixels in the first planar projection image, pixel values of corresponding points in the second planar projection image, and obtains, by interpolation or extrapolation based on the pixel values of the corresponding points, pixel values of integer pixels adjacent to the corresponding points in the second planar projection image, or (b) determines corresponding points in the first planar projection image corresponding to integer pixels in the second planar projection image, obtains, by interpolation or extrapolation based on pixel values of integer pixels adjacent to the corresponding points in the first planar projection image, pixel values of the corresponding points, and obtains, based on the pixel values of the corresponding points, pixel values of the integer pixels in the second planar projection image.

Figure 7:
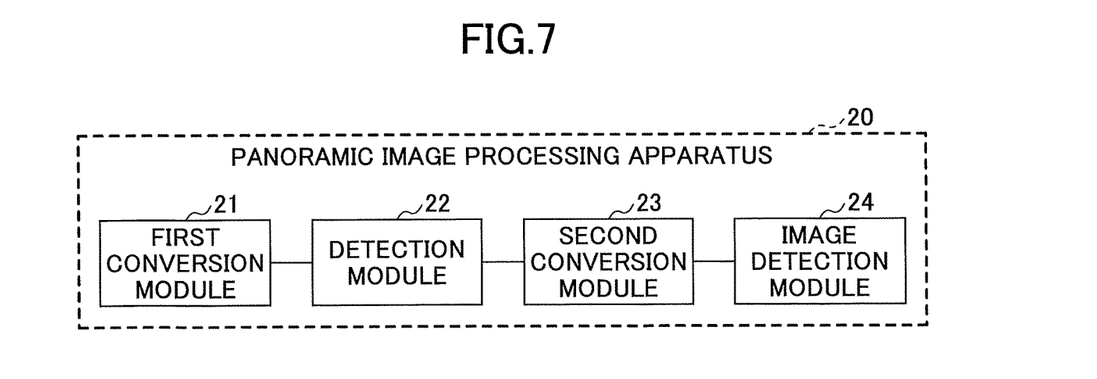
FIG. 7 is a block diagram illustrating a configuration of a panoramic image processing apparatus according to another embodiment of the present invention.

Furthermore, as illustrated in FIG. 7, the panoramic image processing apparatus 20 further includes an image detection module 24.

The image detection module 24 performs image detection for the region of interest in the second planar projection image, after obtaining the second planar projection image of the panoramic image. In this way, image distortion occurring in the region of interest in the second planar projection image can be reduced. Accordingly, the accuracy of the image detection can be improved when performing image detection for the region of interest in the second planar projection image.

Third Embodiment

Figure 8:
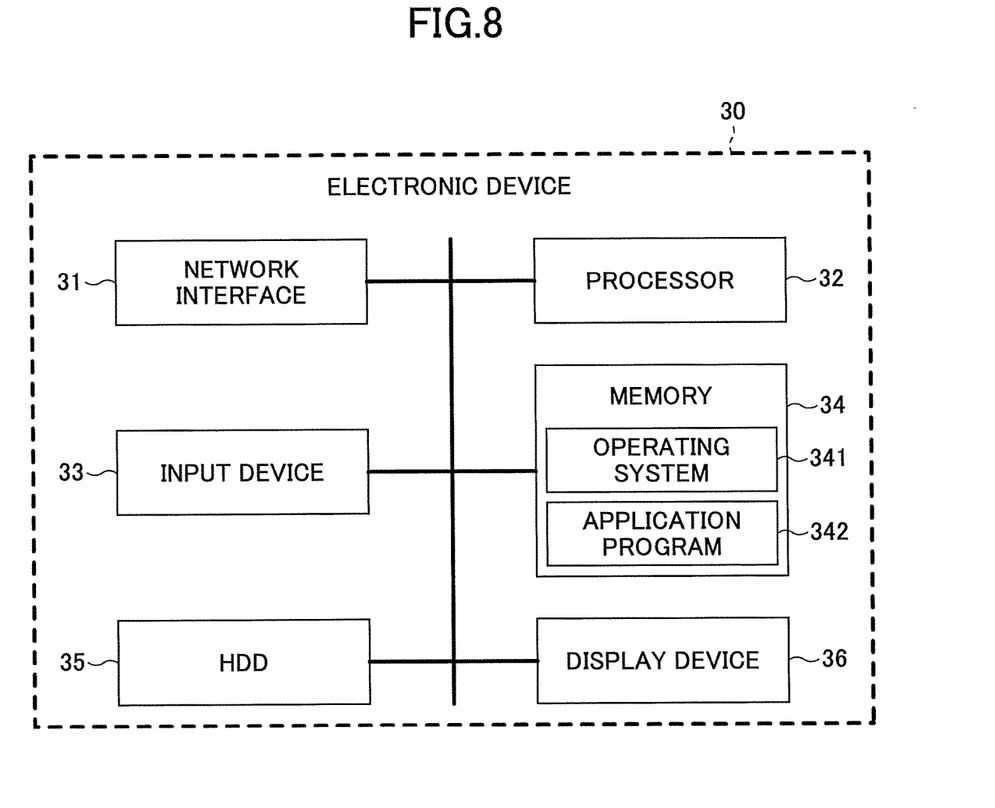
FIG. 8 is a schematic diagram illustrating a configuration of an electronic device for processing a panoramic image according to an embodiment of the present invention.

The present embodiment provides an electronic device 30 for processing a panoramic image. As illustrated in FIG. 8, the electronic device 30 includes a processor 32, and a memory 34 storing computer-readable instructions.

When the computer-readable instructions are executed by the processor 32, the processor converts a first planar projection image of the panoramic image into a spherical image, determines a position of a region of interest in the spherical image, cuts and expands the spherical image based on the position of the region of interest in the spherical image, and obtains a second planar projection image of the panoramic image. A distance between the region of interest in the second planar projection image and a center point of the second planar projection image is shorter than a distance between the region of interest in the first planar projection image and a center point of the first planar projection image.

As illustrated in FIG. 8, the electronic device 30 further includes a network interface 31, an input device 33, a hard disk drive (HDD) 35, and a display device 36.

Each of ports and each of devices may be connected to each other via a bus architecture. The processor 32 such as one or more central processing units (CPUs), and the memory 34 such as one or more memory units may be connected via various circuits. Other circuits such as an external device, a regulator and a power management circuit may also be connected via the bus architecture. Note that these devices are communicably connected via the bus architecture. The bus architecture includes a power supply bus, a control bus and a status signal bus besides a data bus. The detailed description of the bus architecture is omitted here.

The network interface 31 may be connected to a network (such as the Internet, a LAN or the like), obtain related data such as a first planar projection image, and store the related data in the hard disk drive 35.

The input device 33 may receive various commands input by a user, and transmit the commands to the processor 32 to be executed. The input device 33 may include a keyboard, a click apparatus (such as a mouse or a track ball), a touch board, a touch panel or the like.

The display device 36 may display a result obtained by executing the commands.

The memory 34 stores programs and data required for running an operating system, and data such as intermediate results in calculation processes of the processor 32.

Note that the memory 34 of the embodiments of the present invention may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), which used as an external high-speed buffer. The memory 34 of the apparatus or the method described herein includes and is not limited to any other suitable memory.

In some embodiments, the memory 34 stores executable modules or data structure, their subsets, or their superset, i.e., an operating system (OS) 341 and an application program 342.

The operating system 341 includes various system programs for realizing various essential tasks and processing tasks based on hardware, such as a frame layer, a core library layer, a drive layer and the like. The application program 342 includes various application programs for realizing various application tasks, such as a browser and the like. A program for realizing the method according to the embodiments of the present invention may be included in the application program 342.

When the processor 32 invokes and executes the application program and data stored in the memory 34, specifically the program or instructions stored in the application program 342, the processor 32 may convert a first planar projection image of the panoramic image into a spherical image, determine a position of a region of interest in the spherical image, cut and expand the spherical image based on the position of the region of interest in the spherical image, and obtain a second planar projection image of the panoramic image. A distance between the region of interest in the second planar projection image and a center point of the second planar projection image is shorter than a distance between the region of interest in the first planar projection image and a center point of the first planar projection image.

The method according to the above embodiments of the present invention may be applied to the processor 32 or may be realized by the processor 32. The processor 32 may be an integrated circuit chip capable of processing signals. Each step of the above method may be realized by instructions in a form of integrated logic circuit of hardware in the processor 32 or a form of software. The processor 32 may be a general-purpose processor, a digital signal processor (DSP), an application specific integrated circuit (ASIC), field programmable gate array signals (FPGA) or other programmable logic device (PLD), a discrete gate or transistor logic, discrete hardware components capable of realizing or executing the methods, the steps and the logic blocks of the embodiments of the present invention. The general-purpose processor may be a micro-processor, and alternatively, the processor may be any common processors. The steps of the method according to the embodiments of the present invention may be realized by a hardware decoding processor, or combination of hardware modules and software modules in a decoding processor. The software modules may be located in a conventional storage medium such as a random access memory (RAM), a flash memory, a read-only memory (ROM), a erasable programmable read-only memory (EPROM), an electrically erasable programmable read-only memory (EEPROM), a register or the like. The storage medium is located in the memory 34, and the processor 32 reads information in the memory 34 and realizes the steps of the above methods in combination with hardware.

Note that the embodiments described herein may be realized by hardware, software, firmware, intermediate code, microcode or any combination thereof. For hardware implementation, the processor may be realized in one or more application specific integrated circuits (ASIC), digital signal processors (DSP), programmable logic devices (PLD), field programmable gate array signals (FPGA), general-purpose processors, controllers, micro-controllers, micro-processors, or other electronic components or their combinations for realizing functions of the present invention.

For software implementation, the embodiments of the present invention may be realized by executing functional modules (such as processes, functions or the like). Software codes may be stored in a memory and executed by a processor. The memory may be implemented inside or outside the processor.

Specifically, the processor 32 maps a longer side at the top of the first equidistant cylindrical projection image and a longer side at the bottom of the first equidistant cylindrical projection image to a north pole of the spherical image and a south pole of the spherical image, respectively, and merges two shorter sides of the first equidistant cylindrical projection image at 0° longitude of the spherical image.

Specifically, the processor 32 detects the position of the region of interest in the spherical image by a method of color detection, motion detection or artificial feature detection.

Specifically, the processor 32 determines longitude α of a center point of the region of interest in the spherical image, determines an intersection A between a meridian of α+180° longitude of the spherical image and an equator of the spherical image, cuts the spherical image along a cutting line on the equator, a length of the cutting line being equal to half of a length of the equator, and a center point of the cutting line being the intersection A, and expands the cut spherical image in a first direction and a second direction, respectively, the first direction being a direction from the intersection A to a south pole of the spherical image, and the second direction being a direction from the intersection A to a north pole of the spherical image.

Specifically, the processor 32 obtains pixel values of corresponding points in the second planar projection image based on pixel values of integer pixels in the first planar projection image, and obtains pixel values of integer pixels adjacent to the corresponding points in the second planar projection image by interpolation or extrapolation based on the pixel values of the corresponding points. Alternatively, the processor 32 determines corresponding points in the first planar projection image corresponding to integer pixels in the second planar projection image, obtains pixel values of the corresponding points by interpolation or extrapolation based on pixel values of integer pixels adjacent to the corresponding points in the first planar projection image, and obtains pixel values of the integer pixels in the second planar projection image based on the pixel values of the corresponding points.

Specifically, the processor 32 performs image detection for the region of interest in the second planar projection image, after obtaining the second planar projection image of the panoramic image.

In the present embodiment, the first planar projection image of the panoramic image is converted into the spherical image, the spherical image is cut and expanded based on the position of the region of interest in the spherical image, and the second planar projection image of the panoramic image is obtained. The distance between the region of interest in the second planar projection image and the center point of the second planar projection image is shorter than the distance between the region of interest in the first planar projection image and the center point of the first planar projection image. Thus, in the converted second planar projection image, the region of interest is closer to the center point of the second planar projection image, image distortion occurring in the region of interest can be reduced. Accordingly, the accuracy of the image detection can be improved when performing image detection for the region of interest in the second planar projection image.

Fourth Embodiment

Figure 9:
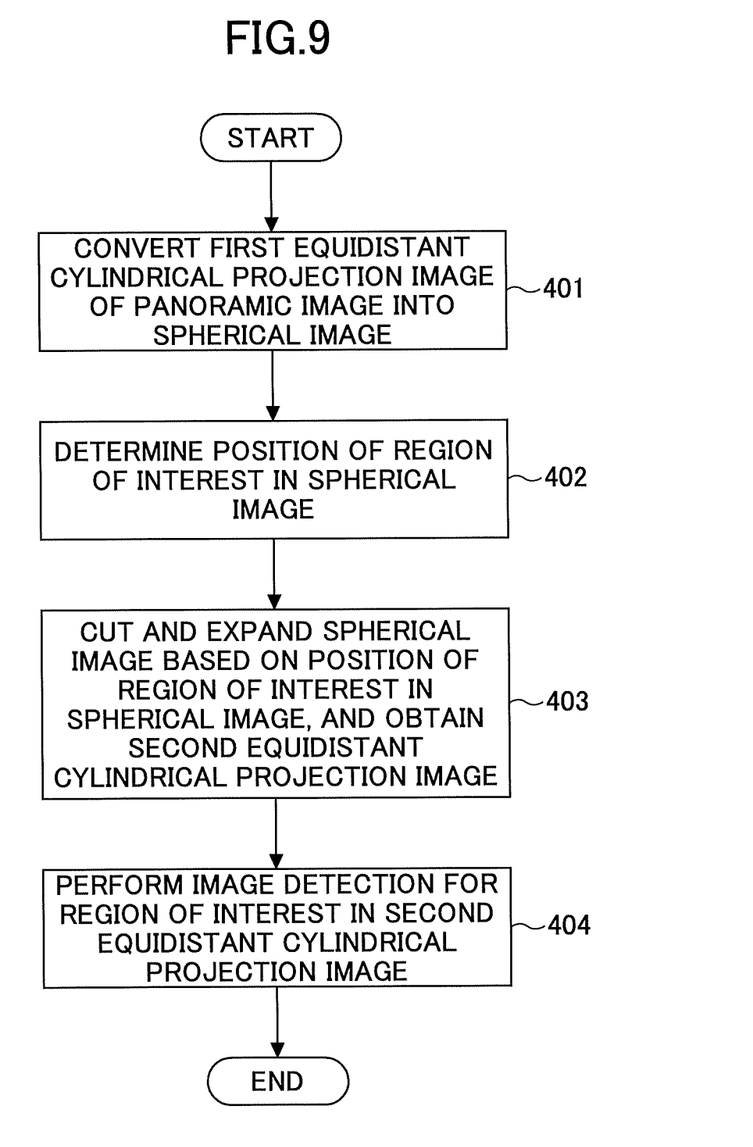
FIG. 9 is a flowchart illustrating a panoramic image processing method according to a specific embodiment of the present invention.

As illustrated in FIG. 9, the panoramic image processing method according to the present embodiment includes steps 401 to 404.

In step 401, a first equidistant cylindrical projection image of a panoramic image is converted into a spherical image.

Before step 401, the panoramic image has been converted, by another software or algorithm, into an equidistant cylindrical projection image whose aspect ratio is 2:1, i.e., the first equidistant cylindrical projection image. The first equidistant cylindrical projection image is converted into the spherical image by mapping a longer side at the top of the first equidistant cylindrical projection image and a longer side at the bottom of the first equidistant cylindrical projection image to a north pole of the spherical image and a south pole of the spherical image, respectively, and merging two shorter sides of the first equidistant cylindrical projection image at 0° longitude of the spherical image.

In the present embodiment, assuming that a width of the first equidistant cylindrical projection image is 2n units, a height of the first equidistant cylindrical projection image is 2n units and a coordinate system is established based on an upper left vertex of the first equidistant cylindrical projection image serving as an origin, a coordinate of each pixel in the first equidistant cylindrical projection image can be represented by $(\theta, \Phi)$, where $2\pi \geq \theta \geq 0$, $\pi \geq \Phi \geq 0$. After converting the first equidistant cylindrical projection image into the spherical image, $\theta$ is longitude of each pixel, and $\Phi$ is latitude of each pixel.

Figure 10:
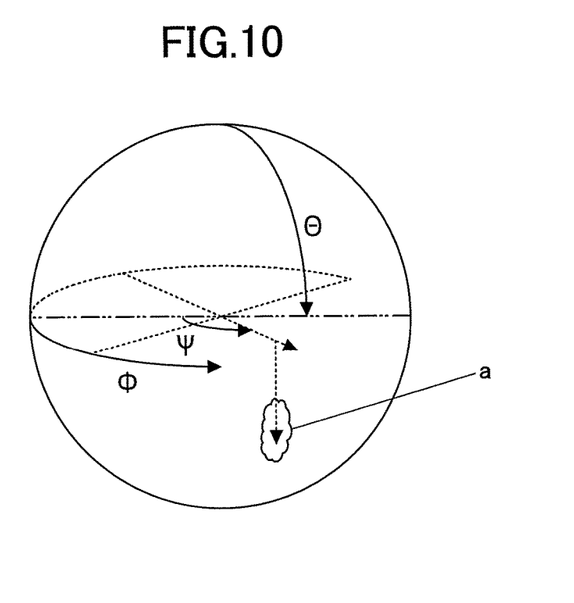
FIG. 10 is a schematic diagram illustrating a spherical image according to the embodiment of the present invention.

The first equidistant cylindrical projection image is mapped onto a surface of the spherical image by exporting the longitude and latitude of each pixel. The conversion is performed by the following equation.

$$\theta = \frac{\text{index of } Y + 0.5}{\text{\# of cols}} * \pi$$

$$\phi = \frac{\text{index of } X + 0.5}{\text{\# of rows}} * 2\pi$$

Where (X, Y) is a coordinate of a pixel in the first equidistant cylindrical projection image, an index of the pixels starts from (0, 0), the obtained spherical image is shown in FIG. 10, where longitude of a region of interest a, i.e., a detection object is represented by $\psi$.

In step 402, a position of the region of interest in the spherical image is determined.

In this step, approximate longitude of the region of interest may be obtained. The method of determining the region of interest in the spherical image includes and is not limited to color detection, motion detection of a region of interest in a video frame, or artificial feature detection combined with another additional sensor (a depth sensor or a binocular camera). The color detection means determining the position of the region of interest in the spherical image using color of the region of interest different from color of background environment. For example, in a case of face recognition, it may be determined that a region whose color is skin color is the region of interest. In a case of motion object detection, it may be determined that a region where motion occurs is the region of interest.

After the region of interest is determined, longitude of a center point of the region of interest may be obtained by the following method.

An average value of longitude of all pixels or a part of pixels of the region of interest is calculated as the longitude of the center point of the region of interest. Alternatively, a probability distribution function of effective pixels of the region of interest is obtained, and an average value with a predetermined confidence range is obtained as the longitude of the center point of the region of interest.

If the region of interest is located in the vicinity of a north pole and a south pole of the first equidistant cylindrical projection image, accuracy limitation for longitude estimation can be reduced. That is to say, in a converted second equidistant cylindrical projection image, the degree of image distortion of a region of interest located at high latitude in the spherical image is relatively low.

In step 403, the spherical image is cut and expanded based on the position of the region of interest in the spherical image, and a second equidistant cylindrical projection image is obtained.

Figure 11:
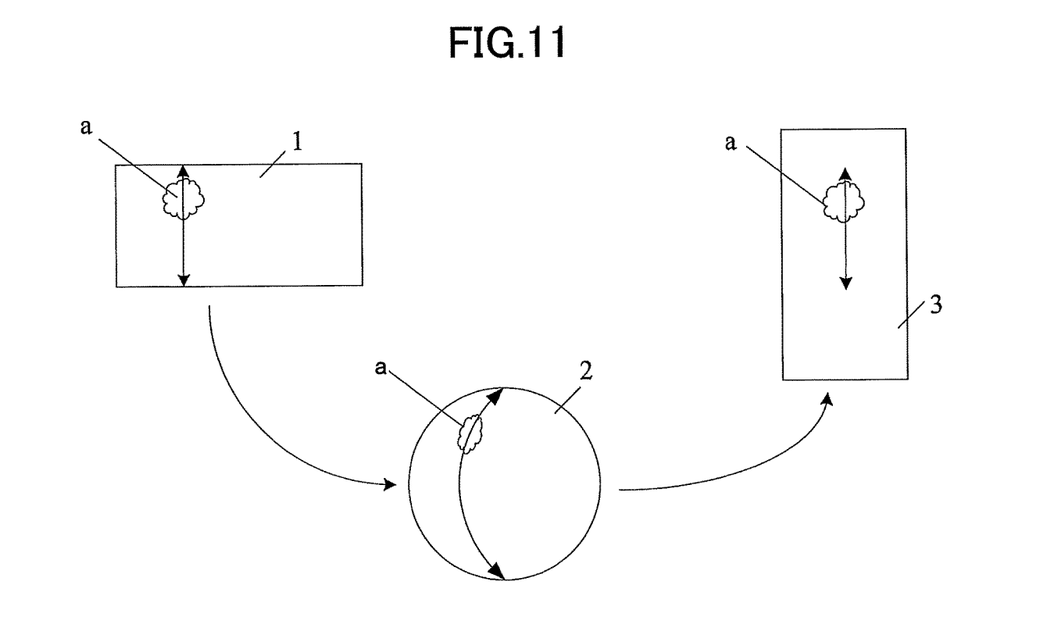
FIG. 11 is a schematic diagram illustrating conversion from the spherical image to a second equidistant cylindrical projection image according to the embodiment of the present invention.

If the longitude of the region of interest is $\psi$, the spherical image is cut along an equator between $\psi+\pi/2$ meridian and $\psi+3\pi/2$ meridian, the cut spherical image is expanded in a direction towards the north pole and a direction towards the south pole, respectively, and the second equidistant cylindrical projection image is obtained. As illustrated in FIG. 11, the spherical image is converted into the second equidistant cylindrical projection image whose aspect ratio is 1:2. In FIG. 11, "1" is the first equidistant cylindrical projection image, "2" is the spherical image, "3" is the second equidistant cylindrical projection image, and "a" is the region of interest.

Figure 12:
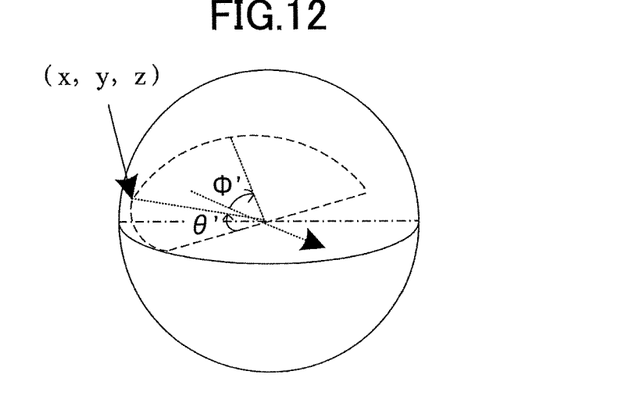
FIG. 12 is a schematic diagram illustrating a point (x, y, z) in the spherical image according to the embodiment of the present invention.

As illustrated in FIG. 12, a calculation formula of a three-dimensional position coordinate (x, y, z) of each point in the spherical image is as follows, where (θ, Φ) is a coordinate of each pixel in the first equidistant cylindrical projection image.

$$x = \sin\theta \cos\phi$$

$$y = \sin\theta \sin\phi$$

$$z = \cos\theta$$

A three-dimensional position coordinate (x', y', z') in the spherical image that corresponds to (x, y, z) may be represented as follows, where ψ is the longitude of the region of interest.

$$x' = -x\cos\psi + y\sin\psi$$

$$y' = x\sin\psi - y\cos\psi$$

$$z = z'$$

A coordinate (θ', Φ') of a point in the converted second equidistant cylindrical projection image that corresponds to point (θ, Φ) in the first equidistant cylindrical projection image may be represented as follows.

$$\phi' = \arctan2(z', x') \text{ if } \theta \in \left[0, \frac{\pi}{2}\right]$$

$$\phi' = 2\pi + \arctan2(z', x') \text{ if } \theta \in \left[\frac{\pi}{2}, \pi\right]$$

$$\theta' = \arctan2(x'\cos\phi' + z'\sin\phi', y')$$

The corresponding points (θ', Φ') are unevenly distributed in the second equidistant cylindrical projection image whose aspect ratio is 1:2.

In an interpolation or extrapolation step of pixels, pixel values of integer pixels in the second equidistant cylindrical projection image may be obtained by the following methods.

(1) obtain pixel values of all corresponding points in the second planar projection image based on pixel values of integer pixels in the first planar projection image, and obtain pixel values of integer pixels in the second planar projection image by interpolation or extrapolation based on the pixel values of all corresponding points. The interpolation algorithm includes and is not limited to double linear interpolation, nearest neighbors interpolation, cubic interpolation and the like.

(2) determine corresponding points in the first planar projection image corresponding to integer pixels in the second planar projection image, obtain pixel values of the corresponding points by interpolation or extrapolation based on pixel values of integer pixels adjacent to the corresponding points in the first planar projection image, and obtain pixel values of the integer pixels in the second planar projection image based on the pixel values of the corresponding points.

In step 404, image detection is performed for the region of interest in the second equidistant cylindrical projection image.

Finally, object detection is performed for the region of interest in the converted second equidistant cylindrical projection image whose aspect ratio is 1:2. Since image distortion occurring in the region of interest in the second equidistant cylindrical projection image is relatively low, the accuracy of the image detection can be improved.

The present invention can solve the problem of image distortion occurring in the vicinity of a north pole and a south pole of a panoramic image, restore image distortion regions close to the north pole or the south pole, and improve detectable rate or accuracy of image detection. The embodiments of the present invention can be applied to various scenes using a panoramic camera.

Figure 13:
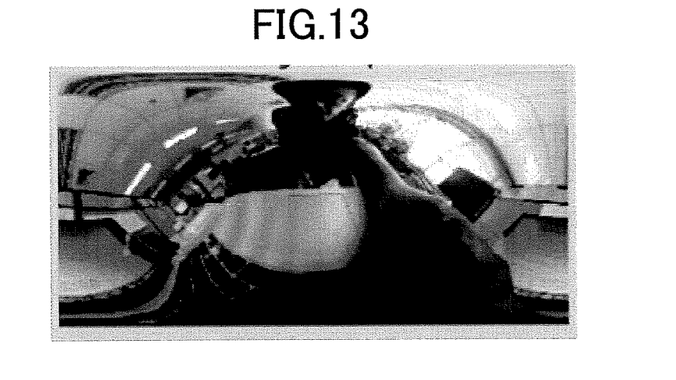
FIG. 13 is one of three first equidistant cylindrical projection images obtained according to the embodiment of the present invention.
Figure 14:
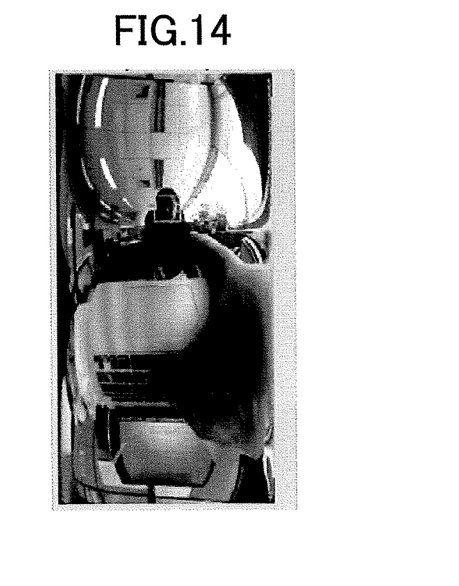
FIG. 14 is a second equidistant cylindrical projection image converted from the first equidistant cylindrical projection image illustrated in FIG. 13 according to the embodiment of the present invention.
Figure 15:
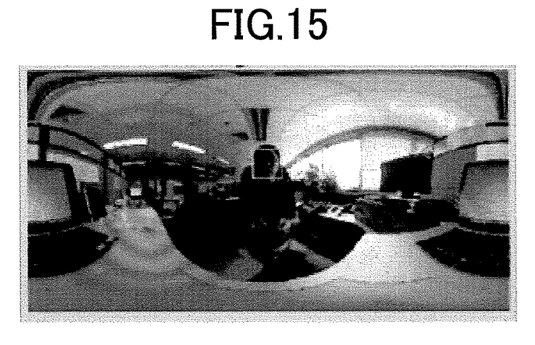
FIG. 15 is one of three first equidistant cylindrical projection images obtained according to the embodiment of the present invention.
Figure 16:
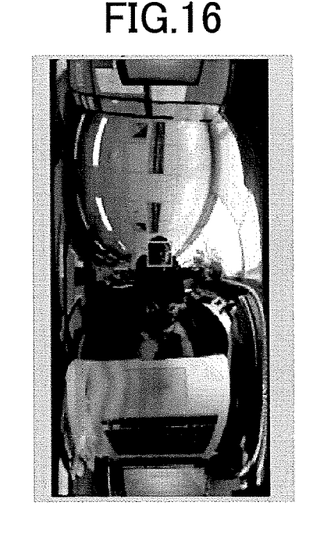
FIG. 16 is a second equidistant cylindrical projection image converted from the first equidistant cylindrical projection image illustrated in FIG. 15 according to the embodiment of the present invention.
Figure 17:
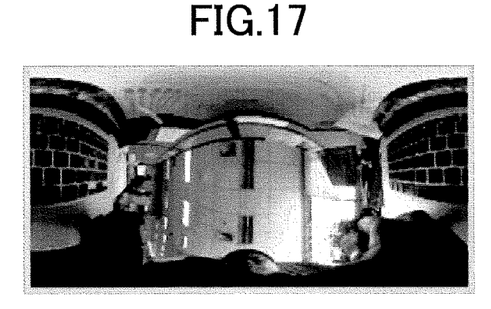
FIG. 17 is one of three first equidistant cylindrical projection images obtained according to the embodiment of the present invention.
Figure 18:
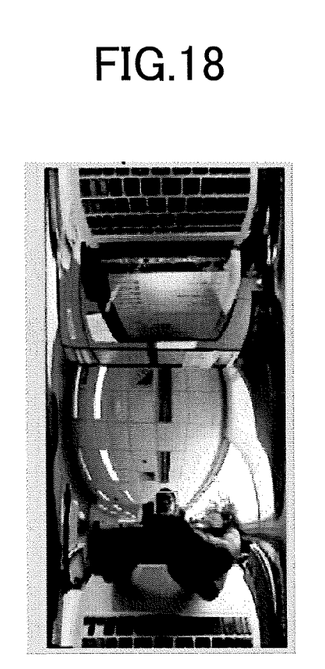
FIG. 18 is a second equidistant cylindrical projection image converted from the first equidistant cylindrical projection image illustrated in FIG. 17 according to the embodiment of the present invention.

As illustrated in FIGS. 13, 15 and 17, in three first equidistant cylindrical projection images obtained according to the present embodiment, since the images obtained by a panoramic camera equidistantly stretch in the vicinity of a north pole or a south pole, severe distortion occurs at the top and bottom of the first equidistant cylindrical projection images, and it is difficult to detect faces by a face detection algorithm. On the other hand, as illustrated in FIGS. 14, 16 and 18, in the second equidistant cylindrical projection images converted using the technology according to the present invention, the image distortion can be greatly reduced, and the accuracy of the image detection can be greatly improved.

The present invention is not limited to the specifically disclosed embodiments, and various modifications, combinations and replacements may be made without departing from the scope of the present invention.

What is claimed is:

1. A method for processing a panoramic image, the method comprising:
converting a first planar projection image of the panoramic image into a spherical image;
determining a position of a region of interest in the spherical image; and
cutting and expanding, based on the position of the region of interest in the spherical image, the spherical image, and obtaining a second planar projection image of the panoramic image, wherein
a distance between the region of interest in the second planar projection image and a center point of the second planar projection image is shorter than a distance between the region of interest in the first planar projection image and a center point of the first planar projection image, and
the cutting and expanding of the spherical image based on the position of the region of interest in the spherical image includes:
determining longitude α of a center point of the region of interest in the spherical image,
determining an intersection A between a meridian of α+180° longitude of the spherical image and an equator of the spherical image,
cutting the spherical image along a cutting line on the equator, a length of the cutting line being equal to half of a length of the equator, and a center point of the cutting line being the intersection A, and
expanding the cut spherical image in a first direction and a second direction, respectively, the first direction being a direction from the intersection A to a south pole of the spherical image, and the second direction being a direction from the intersection A to a north pole of the spherical image.

2. The method for processing a panoramic image according to claim 1,
wherein the first planar projection image is a first equidistant cylindrical projection image, and
wherein converting the first planar projection image of the panoramic image into the spherical image includes
mapping a longer side at the top of the first equidistant cylindrical projection image and a longer side at the bottom of the first equidistant cylindrical projection image to a north pole of the spherical image and a south pole of the spherical image, respectively; and merging two shorter sides of the first equidistant cylindrical projection image at 0° longitude of the spherical image.

3. The method for processing a panoramic image according to claim 1,
wherein determining the position of the region of interest in the spherical image includes
detecting the position of the region of interest in the spherical image by a method of color detection, motion detection or artificial feature detection.

4. The method for processing a panoramic image according to claim 1,
wherein obtaining the second planar projection image of the panoramic image includes
obtaining, based on pixel values of integer pixels in the first planar projection image, pixel values of corresponding points in the second planar projection image, and obtaining, by interpolation or extrapolation based on the pixel values of the corresponding points, pixel values of integer pixels adjacent to the corresponding points in the second planar projection image; or
determining corresponding points in the first planar projection image corresponding to integer pixels in the second planar projection image, obtaining, by interpolation or extrapolation based on pixel values of integer pixels adjacent to the corresponding points in the first planar projection image, pixel values of the corresponding points, and obtaining, based on the pixel values of the corresponding points, pixel values of the integer pixels in the second planar projection image.

5. The method for processing a panoramic image according to claim 1, the method further comprising:
performing image detection for the region of interest in the second planar projection image, after obtaining the second planar projection image of the panoramic image.

6. An apparatus for processing a panoramic image, the apparatus comprising:
a processor; and
a memory storing program instructions that cause the processor to:
convert a first planar projection image of the panoramic image into a spherical image;
determine a position of a region of interest in the spherical image; and
cut and expand, based on the position of the region of interest in the spherical image, the spherical image to obtain a second planar projection image of the panoramic image, wherein
a distance between the region of interest in the second planar projection image and a center point of the second planar projection image is shorter than a distance between the region of interest in the first planar projection image and a center point of the first planar projection image, and
the cutting and expanding of the spherical image based on the position of the region of interest in the spherical image includes:
determining longitude $\alpha$ of a center point of the region of interest in the spherical image;
determining an intersection A between a meridian of $\alpha+180°$ longitude of the spherical image and an equator of the spherical image,
cutting the spherical image along a cutting line on the equator, a length of the cutting line being equal to half of a length of the equator, and a center point of the cutting line being the intersection A; and
expanding the cut spherical image in a first direction and a second direction, respectively, the first direction being a direction from the intersection A to a south pole of the spherical image, and the second direction being a direction from the intersection A to a north pole of the spherical image.

7. The apparatus for processing a panoramic image according to claim 6, wherein
the first planar projection image is a first equidistant cylindrical projection image, and
the program instructions further cause the processor to:
map a longer side at the top of the first equidistant cylindrical projection image and a longer side at the bottom of the first equidistant cylindrical projection image to a north pole of the spherical image and a south pole of the spherical image, respectively; and
merge two shorter sides of the first equidistant cylindrical projection image at 0° longitude of the spherical image.

8. The apparatus for processing a panoramic image according to claim 6, wherein the program instructions further cause the processor to:
detect the position of the region of interest in the spherical image by a method of color detection, motion detection or artificial feature detection.

9. The apparatus for processing a panoramic image according to claim 6, wherein the program instructions further cause the processor to:
obtain, based on pixel values of integer pixels in the first planar projection image, pixel values of corresponding points in the second planar projection image, and obtain, by interpolation or extrapolation based on the pixel values of the corresponding points, pixel values of integer pixels adjacent to the corresponding points in the second planar projection image; or
determine corresponding points in the first planar projection image corresponding to integer pixels in the second planar projection image, obtain, by interpolation or extrapolation based on pixel values of integer pixels adjacent to the corresponding points in the first planar projection image, pixel values of the corresponding points, and obtain, based on the pixel values of the corresponding points, pixel values of the integer pixels in the second planar projection image.

10. The apparatus for processing a panoramic image according to claim 6, wherein the program instructions further cause the processor to:
perform image detection for the region of interest in the second planar projection image, after obtaining the second planar projection image of the panoramic image.

11. An electronic device for processing a panoramic image, the electronic device comprising:
a memory storing computer-readable instructions; and
one or more processors configured to execute the computer-readable instructions such that the one or more processors are configured to
convert a first planar projection image of the panoramic image into a spherical image;
determine a position of a region of interest in the spherical image; and
cut and expand, based on the position of the region of interest in the spherical image, the spherical image, and obtain a second planar projection image of the panoramic image, wherein a distance between the region of interest in the second planar projection image and a center point of the second planar projection image is shorter than a distance between the region of interest in the first planar projection image and a center point of the first planar projection image, and the cutting and expanding of the spherical image based on the position of the region of interest in the spherical image includes:

determining longitude $\alpha$ of a center point of the region of interest in the spherical image;

determining an intersection A between a meridian of $\alpha+180°$ longitude of the spherical image and an equator of the spherical image;

cutting the spherical image along a cutting line on the equator, a length of the cutting line being equal to half of a length of the equator, and a center point of the cutting line being the intersection A; and expanding the cut spherical image in a first direction and a second direction, respectively, the first direction being a direction from the intersection A to a south pole of the spherical image, and the second direction being a direction from the intersection A to a north pole of the spherical image.

\* \* \* \* \*